United States Patent
Osby et al.

(10) Patent No.: US 9,150,681 B2
(45) Date of Patent: Oct. 6, 2015

(54) ETHYLENE-BASED POLYMERS AND PROCESSES FOR THE SAME

(75) Inventors: John O. Osby, Lake Jackson, TX (US); Mehmet Demirors, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/881,358

(22) PCT Filed: Oct. 5, 2011

(86) PCT No.: PCT/US2011/054843
§ 371 (c)(1),
(2), (4) Date: Apr. 24, 2013

(87) PCT Pub. No.: WO2012/057975
PCT Pub. Date: May 3, 2012

(65) Prior Publication Data
US 2013/0237678 A1    Sep. 12, 2013

Related U.S. Application Data

(60) Provisional application No. 61/408,124, filed on Oct. 29, 2010.

(51) Int. Cl.
| | |
|---|---|
| C08F 216/34 | (2006.01) |
| C08F 216/36 | (2006.01) |
| C08F 216/38 | (2006.01) |
| C08F 220/28 | (2006.01) |
| C08F 210/02 | (2006.01) |
| C08F 220/50 | (2006.01) |
| C08F 28/04 | (2006.01) |
| C08F 26/02 | (2006.01) |
| C08F 2/38 | (2006.01) |
| C08F 10/02 | (2006.01) |
| C08F 28/02 | (2006.01) |
| C08F 220/00 | (2006.01) |
| C08F 26/08 | (2006.01) |

(52) U.S. Cl.
CPC ............. C08F 220/28 (2013.01); C08F 210/02 (2013.01); C08F 220/50 (2013.01); *C08F 2/38* (2013.01); *C08F 10/02* (2013.01); *C08F 26/02* (2013.01); *C08F 26/08* (2013.01); *C08F 28/02* (2013.01); *C08F 28/04* (2013.01); *C08F 220/00* (2013.01)

(58) Field of Classification Search
CPC .......... C08F 10/02; C08F 26/02; C08F 26/08; C08F 28/02; C08F 28/04; C08F 210/02; C08F 220/50; C08F 220/00; C08F 220/28; C08F 2/38

USPC ................................................ 526/298, 348.8
See application file for complete search history.

(56) References Cited

U.S. PATENT DOCUMENTS

| | | | |
|---|---|---|---|
| 4,250,070 A | 2/1981 | Ley et al. | |
| 5,539,075 A | 7/1996 | Gustafsson et al. | |
| 5,569,703 A * | 10/1996 | Yoshii et al. | 524/558 |
| 5,747,616 A * | 5/1998 | Muller et al. | 526/262 |
| 6,063,865 A * | 5/2000 | Ball et al. | 525/57 |
| 6,117,492 A | 9/2000 | Goldstein et al. | |
| 2002/0187270 A1 * | 12/2002 | Goldstein et al. | 427/385.5 |
| 2004/0147190 A1 | 7/2004 | Goldstein et al. | |
| 2008/0242809 A1 | 10/2008 | Neuteboom et al. | |
| 2011/0178235 A1 | 7/2011 | Sugimoto | |

FOREIGN PATENT DOCUMENTS

| | | |
|---|---|---|
| EP | 1650232 A1 | 4/2006 |
| WO | 97/45465 A1 | 12/1997 |
| WO | 2006/094723 A1 | 9/2006 |
| WO | 2007/110127 A1 | 10/2007 |
| WO | 2011/075465 A1 | 6/2011 |
| WO | 2012/044503 A1 | 4/2012 |
| WO | 2012/044504 A1 | 4/2012 |
| WO | 2012/057975 A1 | 5/2012 |
| WO | 2012/059042 A1 | 5/2012 |
| WO | 2012/084787 A1 | 6/2012 |

OTHER PUBLICATIONS

Zhang, Kejian et al, "Chain Walking Ethylene Copolymerization with an ATRP Inimer for One-pot Synthesis of Hyperbranching Polyethylenes Tethered with ATRP Initiating Sites", 2007, Macromolecular Rapid Communications, 28, 2185-2191.*
Liu, J. Polym. Sci.: Part A: Polym. Chem., 2008, vol. 46, p. 1449-1459.
PCT/US12/064284 Dow Case No. 69774-WO-PCT.
PCT/US12/066102 Dow Case No. 71572-WO-PCT.
Tung, J. Polym. Sci. Polym. Chem. Ed., 1981, vol. 19, p. 2027-2039.
Tung, J. Polym. Sci. Polym. Chem. Ed., 1981, vol. 19, p. 3209-3217.
PCT/US2011/054843, International Search Report and Written Opinion of the International Searching Authority.
PCT/US2012/068727, International Search Report and Written Opinion of the International Searching Authority.

* cited by examiner

*Primary Examiner* — Ling Choi
*Assistant Examiner* — David L Miller

(57) ABSTRACT

The invention provides an ethylene-based polymer formed from at least the following: ethylene and a "monomeric chain transfer agent (monomeric CTA)," comprising a "copolymerization end" and a "chain transfer end."

11 Claims, 1 Drawing Sheet

ETHYLENE-BASED POLYMERS AND PROCESSES FOR THE SAME

REFERENCE TO RELATED APPLICATIONS

The present application is a 371 application of International Application No. PCT/US11/54843, filed on Oct. 5, 2011, which claims the benefit of U.S. Provisional Application No. 61/408,124, filed on Oct. 29, 2010, and fully incorporated herein by reference.

BACKGROUND

Conventional low density polyethylene (LDPE) has good processability, however, when used in film application, increased melt strength is still desired.

U.S. Publication No. 2008/0242809 discloses a process for the preparation of a copolymer of ethylene and a comonomer, and where the polymerization takes place in a tubular reactor, at a peak temperature between 290° C. and 350° C. The comonomer is a di- or higher functional (meth)acrylate, and the co monomer is used in an amount between 0.008 mole percent and 0.200 mole percent, relative to the amount of ethylene copolymer.

International Publication No. WO 2007/110127 discloses an extrusion coating composition comprising an ethylene copolymer. The ethylene copolymer is obtained by a polymerization process in a tubular reactor, at a peak temperature between 300° C. and 350° C., and the comonomer is a bifunctional α,ω-alkadiene.

U.S. Pat. No. 5,539,075 discloses the polymerization of ethylene and at least one monomer, which is copolymerizable with ethylene, and includes a polyunsaturated comonomer having a chain of at least eight carbon atoms and at least two non-conjugated double bonds, of which at least one is terminal. The polymerization takes place at a pressure of about 100-300 MPa, and a temperature of about 80°-300° C., under the action of a radical initiator. The polyunsaturated comonomer preferably is an α,ω-alkadiene having 8-16 carbon atoms, and most preferred 1,9-decadiene. Apart from the polyunsaturated comonomer, the polymerization may also involve another vinyl-unsaturated monomer, preferably containing at least one functional group selected from hydroxyl groups, alkoxy groups, carbonyl groups, carboxyl groups and ester groups. The ethylene copolymers produced have an increased degree of unsaturation, which can be used for cross-linking the ethylene copolymer or grafting reactive groups.

International Publication No. WO 97/45465 discloses an unsaturated ethylene copolymer, a method for producing it, and its use for producing cross-linked structures. The unsaturated ethylene copolymer comprises a polymer obtained by radical polymerization, through a high-pressure process of ethylene and at least one monomer, which is copolymerizable with ethylene, and includes a diunsaturated comonomer of the formula (I): H2C=CH—O—R—CH=CH2, wherein R=—(CH2)$_m$—O—, —(CH2CH2O)n—, or —CH2-C6H10-C H2-O—, m=2-10, and n=1-5. Preferably, the comonomer of formula (I) is 1,4-butanediol divinyl ether.

Tung, L. H., et al., *Preparation of Polystyrene with Long Chain Branches via Free Radical Polymerization*, J. Polym. Sci., Polym. Chem. Ed., (1981), 19, 2027-39, discloses the use of small amounts of chain-transferring monomers to copolymerize with styrene, free-radically. Of the comonomers examined, vinylbenzylthiol, yielded polystyrene with a branched structure. The branches are disclosed as occurring mainly in the low molecular weight end of the distribution. Vinylbenzylthiol was also found to be an effective agent for the broadening of the molecular weight distribution.

Tung, L. H., *Branching Kinetics in Copolymerization of Styrene with a Chain-Transfer Monomer*, J. Polym. Sci., Polym. Chem. Ed., (1981), 19, 3209-3217, discloses the use of polymerization kinetics to compute the theoretical molecular weight and degree of branching for the polymerization with styrene with a chain transfer monomer (for example, vinylbenzylthiol).

Liu, J., et al., *Branched Polymer via Free Radical Polymerization of Chain Transfer Monomer: A Theoretical and Experimental Investigation*, J. Polym. Sci. Part A: Polym. Chem., (2007), 46, 1449-59, discloses a mathematical model for the free radical polymerization of chain transfer monomers containing both polymerizable vinyl groups and telogen groups. The molecular architecture of the polymer is disclosed as being prognosticated according to the developed model, which was validated experimentally by the homopolymerization of 4-vinyl benzyl thiol (VBT), and its copolymerization with styrene.

However, as discussed, there remains a need for ethylene-based polymers, such as low density polyethylene (LDPE), with improved melt strength, especially for film applications. There is a further need for such polymers with a low insoluble content. These needs and others have been met by the following invention.

SUMMARY OF THE INVENTION

The invention provides an ethylene-based polymer formed from at least the following: ethylene and a "monomeric chain transfer agent (monomeric CTA)," comprising a "copolymerization end" and a "chain transfer end."

The invention also provides an ethylene-based polymer comprising at least one structural unit selected from the following:

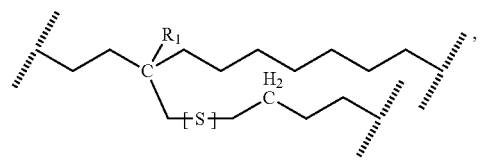

wherein R1 is selected from H or CH3.

DETAILED DESCRIPTION

Figure 1:
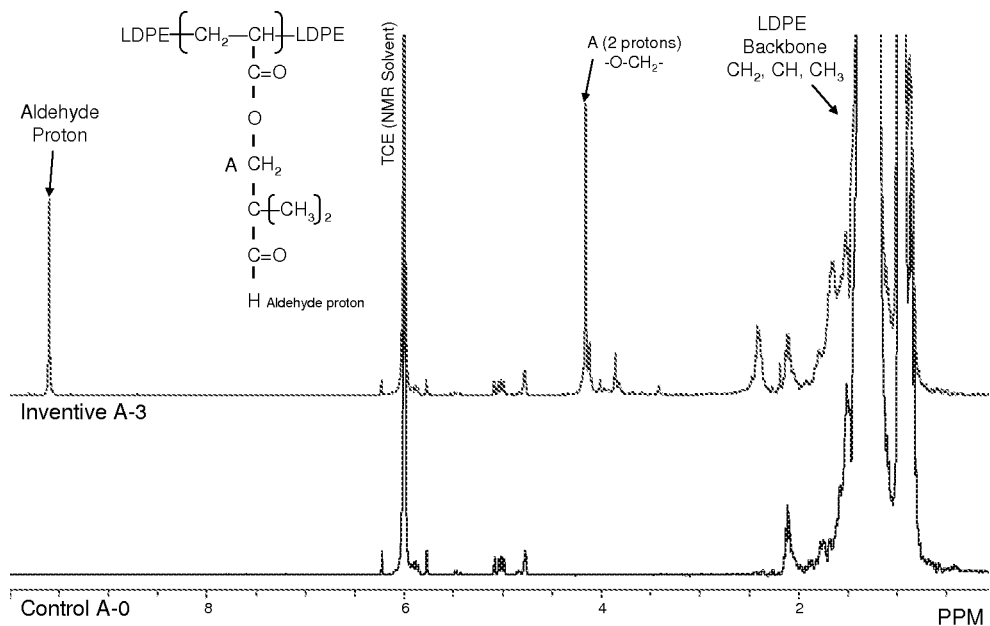
FIG. 1 depicts the $^1$H NMR profile for the control A-0 polymer (lower profile) and the 1H NMR profile for the inventive A-3 polymer (upper profile).

As discussed above, in a first aspect, the invention provides an ethylene-based polymer formed from at least the following: ethylene and a "monomeric chain transfer agent (monomeric CTA)," comprising a "copolymerization end" and a "chain transfer end."

The invention also provides, in a second aspect, an ethylene-based polymer comprising at least one structural unit selected from the following:

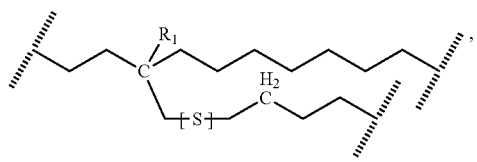

wherein R1 is selected from H or CH3. Here, the notation "⦚⦚⦚⦚⦚⦚" represents a break at the center of a covalent bond between the noted portion of structural unit and a portion of the remaining chemical structure of the polymer.

The following embodiments apply to both the first and second aspects of the invention, except where noted.

In one embodiment, in the first aspect, the "monomeric chain transfer agent" is not a "non-conjugated diunsaturated monomer."

In one embodiment, the ethylene-based polymer comprises, in reacted form, at least 0.075 moles of the monomeric CTA per 1000 moles of ethylene-based polymer backbone carbons, based on the weight of the polymer.

In one embodiment, the ethylene-based polymer comprises, in reacted form, less than, or equal to, 10 moles monomeric CTA per 1000 moles of ethylene-based polymer back bone carbons, based on the weight of the polymer.

In one embodiment, the ethylene-based polymer comprises, in reacted form, less than, or equal to, 5 moles monomeric CTA per 1000 moles of ethylene-based polymer back bone carbons, based on the weight of the polymer.

In one embodiment, the ethylene-based polymer comprises, in reacted form, at least 0.03 wt % of the monomeric CTA, based on the weight of the polymer.

In one embodiment, the ethylene-based polymer has melt strength [MS] (cN) and melt index I2 (g/10 min) according to the following equation:

$$[MS] > 15.5 * \mathrm{EXP}\left[-\frac{\log(I_2)}{1.07}\right] - 2.4.$$

In one embodiment, the ethylene-based polymer has a strain hardening factor (SHF) greater than 3, at Hencky strain rates from $10\ s^{-1}$ to $1.0\ s^{-1}$, and at 150° C. The SHF is the ratio of the extensional viscosity to three times of the shear viscosity at the same measurement time and at the same temperature. The "measurement time" is defined as the ratio of "three" to the "applied Hencky strain rate in the extensional viscosity measurement." For example, the measurement time is 0.3 second for a strain rate of $10\ s^{-1}$, 3.0 second for a strain rate of $1\ s^{-1}$, and 30 seconds for a strain rate of $0.1\ s^{-1}$.

In one embodiment the ethylene-based polymer has a melt index (I2) from 0.01 to 1000, typically from 0.05 to 100, and more typically from 0.1 to 50, grams per 10 minutes (g/10 min).

In one embodiment, the ethylene-based polymer has a melt index ($I_2$) from 0.3 to 100 g/10 min, or from 1 to 50 g/10 min, or from 2 to 20 g/10 min.

In one embodiment the ethylene-based polymer has a density greater than, or equal to, 0.91, or greater than, or equal to, 0.92, or greater than, or equal to, 0.93, grams per cubic centimeter (g/cc or g/cm³).

In one embodiment the ethylene-based polymer has a density less than, or equal to, 0.96, or less than, or equal to, 0.95, or less than, or equal to, 0.94, grams per cubic centimeter (g/cc or g/cm³).

In one embodiment the ethylene-based polymer has a density from 0.91 to 0.96, or from 0.91 to 0.95, or from 0.91 to 0.94, g/cc.

In one embodiment, the ethylene-based polymer has an insoluble material content less than 10 wt %, preferably less than 8 wt %. The insoluble material content is determined by High Temperature Gel permeation Chromatography (HT GPC) as discussed herein.

In one embodiment, in the second aspect, [—S—] is selected from the following:

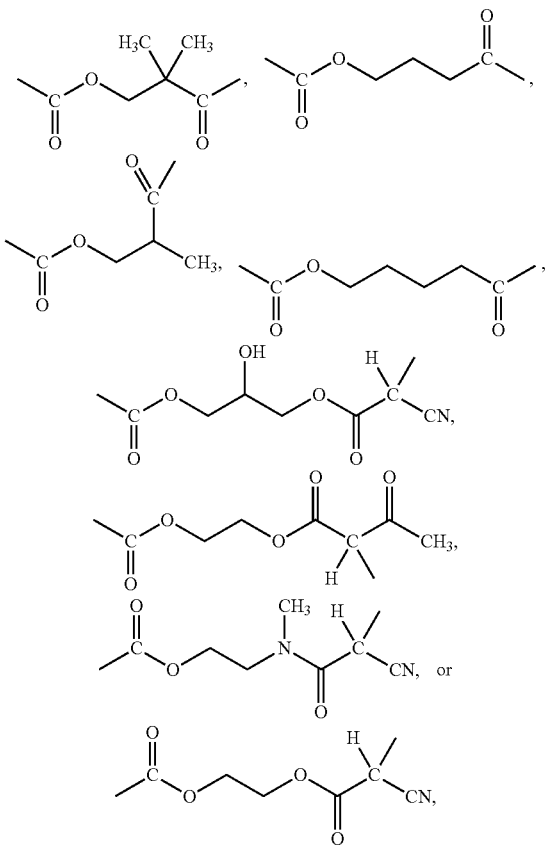

For each "[—S—]" structure, the two free line ends of each structure represent the two bonds connected to the remaining chemical structure of the polymer.

In one embodiment, in the second aspect, [—S—] is selected from the following:

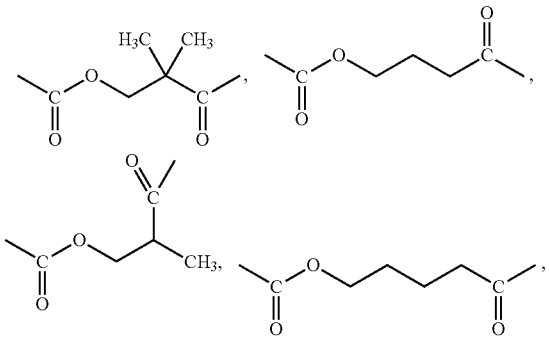

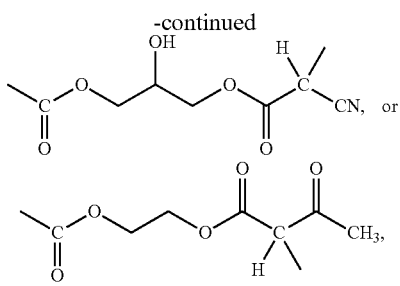

In one embodiment, in the second aspect, the at least one structural unit is the following:

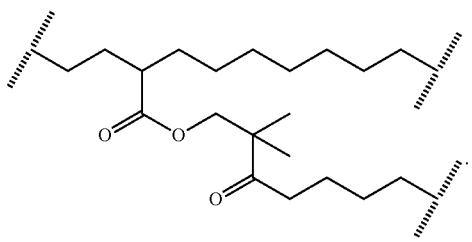

Here, the notation "||||||||" represents a break at the center of a covalent bond between the noted portion of structural unit and a portion of the remaining chemical structure of the polymer.

The invention also provides a composition comprising an inventive ethylene-based polymer, as described herein.

In one embodiment, the composition further comprises an ethylene/α-olefin interpolymer with a density less than, or equal to, 0.94 g/cc.

The invention also provides an article comprising at least one component formed from an inventive composition.

In one embodiment, the article is a film or a coating.
In one embodiment, the article is a film.
In one embodiment, the article is a coating.

An inventive ethylene-based polymer may comprise a combination of two or more embodiments as described herein.

An inventive composition may comprise a combination of two or more embodiments as described herein.

An inventive article may comprise a combination of two or more embodiments as described herein.

The invention also provides a process to form an inventive ethylene-based polymer, as described herein, the process comprising polymerizing ethylene in the presence of the monomeric chain transfer agent (monomeric CTA).

In one embodiment, the ethylene is polymerized in the presence of at least 50 mole ppm (based on amount of total monomers in reaction feed) of the monomeric chain transfer agent (monomeric CTA).

In one embodiment, the polymerization pressure is greater than, or equal to, 100 MPa.

In one embodiment, the polymerization takes place in at least one tubular reactor or at least one autoclave.

In one embodiment, the polymerization takes place in at least one autoclave.

In one embodiment, the polymerization takes place in at least one tubular reactor.

In one embodiment, the monomeric chain transfer agent is added to the polymerization in an amount from 0.0050 to 0.3000 mole percent, based on the total moles of ethylene and monomeric CTA added to the polymerization. In a further embodiment, the polymerization takes place in two reactors. In another embodiment, the polymerization takes place in one reactor.

An inventive process may comprise a combination of two or more embodiments as described herein.

Inventive ethylene-based polymers have been discovered, and which are prepared from at least the following: ethylene and a monomeric chain transfer agent. The monomeric chain transfer agent preferably has a carbon-carbon double bond on one end of the molecule and a chemical functional group capable of reactive chain transfer on the other end. For example, inventive polymers have been prepared by polymerizing ethylene in the presence of 2-propenoic acid, 2,2-dimethyl-3-oxopropyl ester, also known as isobutyl aldehyde acrylate (IBAA). The inventive polymers have improved (higher) melt strength as compared to conventional LDPE. It has also been discovered that the inventive polymers can be blended with other polymers, such as linear low density polyethylene (LLDPE), to make blends that have superior melt strength and rheology compared to conventional LDPE/LLDPE blends. The enhanced rheological characteristics make the inventive polymers and their blends extremely suitable for extrusion coating or blown film applications. It has also been discovered that the inventive polymers contain low amounts of insolubles.

Process

For producing a highly branched ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 meters. The beginning of a reaction zone, for either type of reactor, is typically defined by the side injection of either initiator of the reaction, ethylene, chain transfer agent (or telomer), comonomer(s), as well as any combination thereof. A high pressure process can be carried out in autoclave or tubular reactors having one or more reaction zones, or in a combination of autoclave and tubular reactors, each comprising one or more reaction zones.

In one embodiment an initiator is injected prior to the reaction zone where free radical polymerization is to be induced.

Often a conventional chain transfer agent is used to control molecular weight. In a preferred embodiment, one or more conventional chain transfer agents (CTAs) are added to an inventive polymerization process. Typical CTA that can be used include, but are not limited to, propylene, isobutane, n-butane, 1-butene, methyl ethyl ketone, acetone, ethyl acetate, propionaldehyde, ISOPAR (ExxonMobil Chemical Co.), and isopropanol. In one embodiment, the amount of CTA used in the process is from 0.03 to 10 weight percent of the total reaction mixture.

In one embodiment the process may include a process recycle loop to improve conversion efficiency.

Ethylene used for the production of ethylene-based polymer may be purified ethylene, which is obtained by removing polar components from a loop recycle stream, or by using a reaction system configuration, such that only fresh ethylene is used for making the inventive polymer. It is not typical that purified ethylene is required to make ethylene-based polymer. In such cases ethylene from the recycle loop may be used.

In one embodiment, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

In one embodiment, the ethylene-based polymer comprises ethylene and at least one monomeric CTA as the only monomeric units.

Monomeric Chain Transfer Agents

A monomeric CTA (mCTA) is a comonomer, wherein one end of the comonomer incorporates (or reacts) by copolymerization, and another portion of the comonomer incorporates (or reacts) by chain transfer.

In one embodiment, the "copolymerization end" of the monomeric chain transfer agent is selected from the group consisting of the following:

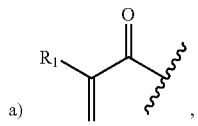

where R1 is selected from H, CH3, CH2CH3, CN, or COCH3;

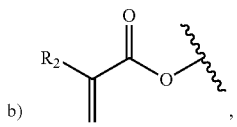

where R2 is selected from H, CH3, CH2CH3, CN, or COCH3;

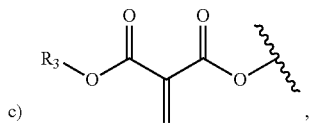

where R3 is selected from H, C1-C22 alkyl, C3-C8 cycloalkyl, or Phenyl;

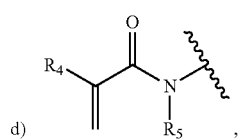

where R4 is selected from H, CH3, CH2CH3, CN, or COCH3, and R5 is selected from H, C1-C22 alkyl, C3-C8 cycloalkyl, Phenyl, or COCH3;

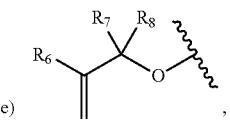

where R6, R7, R8 are each independently selected from H, CH3, or CH2CH3;

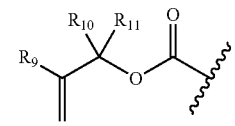

where R9, R10, R11 are each independently selected from H, CH3, or CH2CH3;

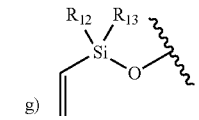

where R12, R13 are each independently selected from H, CH3, CH2CH3 or Phenyl;

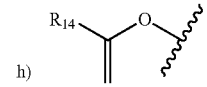

where R14 is selected from H, CH3, CH2CH3, or CN;

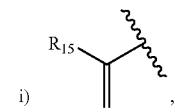

where R15 is selected from H, C1-C22 alkyl, C3-C8 cycloalkyl, or Phenyl; and

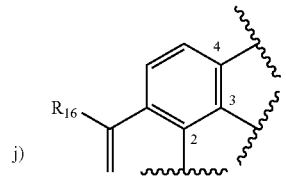

where R16 is selected from H, CH3, CN, or COCH3.

In structures a through j above, the notation ∼∼∼ represents a break at the center of a covalent bond between the "monomeric moiety (copolymerization end)" of the monomeric chain transfer agent and the remaining chemical structure of the monomeric chain transfer agent.

In one embodiment, the "copolymerization end" of the monomeric chain transfer agent is selected from the group consisting of structures a through i, as shown above.

In one embodiment, the "copolymerization end" of the monomeric chain transfer agent is selected from the group consisting of structures a through g, as shown above.

In one embodiment, the "copolymerization end" of the monomeric chain transfer agent is selected from the group consisting of structures a through d, as shown above.

In one embodiment, the "chain transfer end" of the monomeric chain transfer agent is selected from the group consisting of the following:

1) 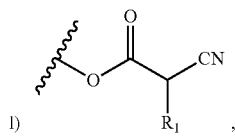

where R1 is selected from H, C1-C22 alkyl, C3-C8 cycloalkyl, CN, Phenyl, COCH3, Cl, Br, or I;

2) 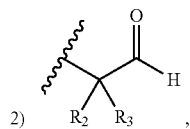

where R2, R3 are each independently selected from H, C1-C22 alkyl, C3-C8 cycloalkyl, CN, Phenyl, or COCH3;

3) 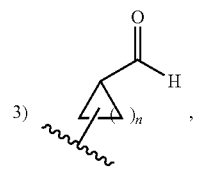

where n is from 1 to 6;

4) 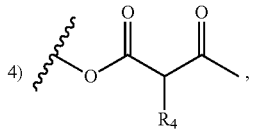

where R4 is selected from H, C1-C22 alkyl, C3-C8 cycloalkyl, Phenyl, Cl, Br, or I;

5) 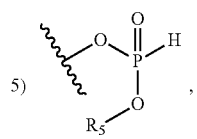

where R5 is selected from C1-C22 alkyl, C3-C8 cycloalkyl, or Phenyl;

6) 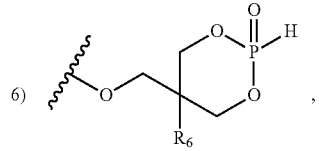

where R6 is selected from C1-C22 alkyl, C3-C8 cycloalkyl, or Phenyl;

7) 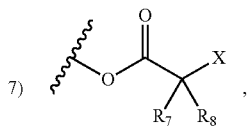

where R7, R8 are each independently selected from H, C1-C22 alkyl, C3-C8 cycloalkyl, Phenyl, Cl, Br, or I; and X is selected from F, Cl, Br, or I;

8) 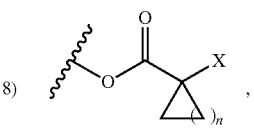

where X is selected from Cl, Br, or I; and n is from 1 to 6;

9) 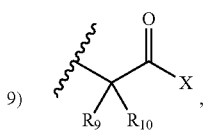

where R9, R10 are each independently selected from H, C1-C22 alkyl, C3-C8 cycloalkyl, CN, Phenyl, or COCH3; and X is selected from Cl, Br, or I;

10) 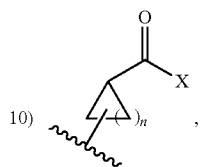

where X is selected from Cl, Br, or I; and n is from 1 to 6;

11) 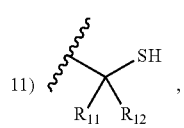

where R11, R12 are each independently selected from H, C1-C22 alkyl, C3-C8 cycloalkyl, CN, Phenyl, or COCH3;

12) 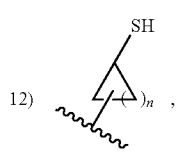

where n is from 1 to 6;

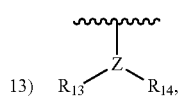

13)

where R13 is selected from H, C1-C22 alkyl, C3-C8 cycloalkyl, or Phenyl; R14 is selected from H, C1-C22 alkyl, or C3-C8 cycloalkyl; and Z is selected from N or P;

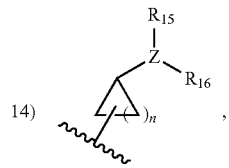

14)

where R15 is selected from H, C1-C22 alkyl, C3-C8 cycloalkyl, or Phenyl; R16 is selected from H, C1-C22 alkyl, or C3-C8 cycloalkyl; Z is selected from N or P; and n is from 1 to 6;

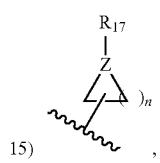

15)

where R17 is selected from H, C1-C22 alkyl, C3-C8 cycloalkyl, or Phenyl; Z is selected from N or P; and n is from 1 to 6;

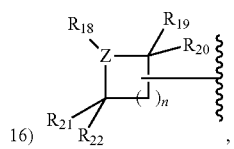

16)

where R18, R19, R20, R21, R22 are each independently selected from H, C1-C22 alkyl, or C3-C8 cycloalkyl; Z is selected from N or P; and n is from 1 to 6: and

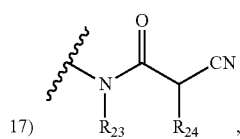

17)

where R23 is selected from H, C1-C22 alkyl, C3-C8 cycloalkyl, Phenyl; and R24 is selected from H, C1-C22 alkyl, C3-C8 cycloalkyl, CN, Phenyl, COCH3, Cl, Br, or I.

In structures 1 through 17 above, the notation ～ represents a break at the center of a covalent bond between the "chain transfer end" of the monomeric chain transfer agent and the remaining chemical structure of the monomeric chain transfer agent.

In one embodiment, the "chain transfer end" of the monomeric chain transfer agent is selected from the group consisting of structures 1 through 16, as shown above.

In one embodiment, the "chain transfer end" of the monomeric chain transfer agent is selected from the group consisting of structures 1 through 10, as shown above.

In one embodiment, the "chain transfer end" of the monomeric chain transfer agent is selected from the group consisting of structures 1 through 4, as shown above.

A monomeric chain transfer agent may comprise a combination of two or more embodiments as disclosed herein.

In one embodiment, the monomeric chain transfer agent (monomeric CTA) is selected from the group consisting of the following:

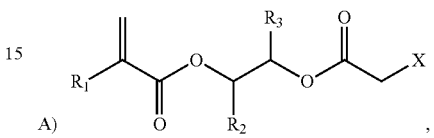

A)

where R1, R2, R3 are each independently selected from H, C1-C6 alkyl, C3-C8 cycloalkyl, or Phenyl; and X is selected from CN, F, Cl, Br or I;

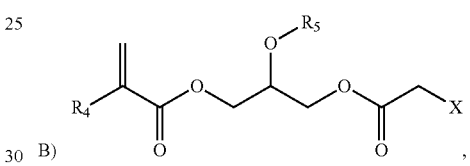

B)

where R4 is selected from H, C1-C6 alkyl, C3-C8 cycloalkyl, or Phenyl; R5 is selected from H, C1-C18 alkyl, C1-C18 carboxy ester, C7 Aromatic ester, C3-C8 cycloalkyl, Phenyl or Benzyl; and X is selected from CN, F, Cl, Br or I;

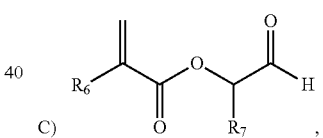

C)

where R6, R7 are each independently selected from H, C1-C6 alkyl, C3-C8 cycloalkyl, or Phenyl;

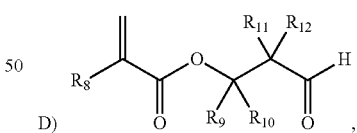

D)

where R8 is selected from H, C1-C6 alkyl, C3-C8 cycloalkyl, or Phenyl; R9, R10, R11, R12 are each independently selected from H or CH3;

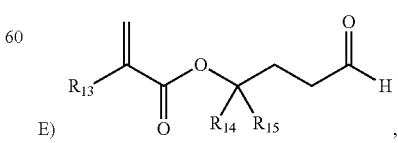

E)

where R13, R14, R15 are each independently selected from H or CH3;

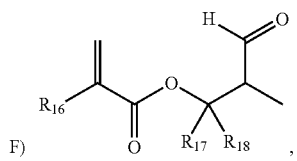

F)

where R16, R17, R18 are each independently selected from H or CH3;

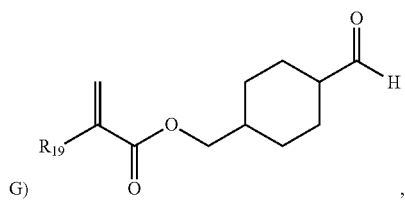

G)

where R19 is selected from H or CH3;

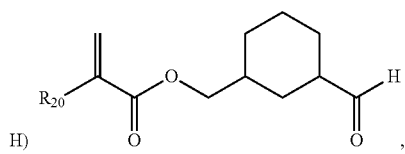

H)

where R20 is selected from H or CH3;

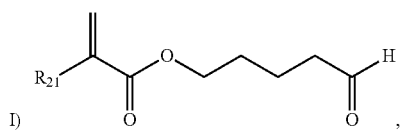

I)

where R21 is selected from H or CH3;

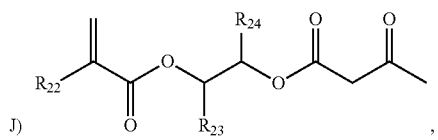

J)

where R22 is selected from H or CH3; R23, R24 are each independently selected from H, C1-C6 alkyl, C3-C8 cycloalkyl, or Phenyl;

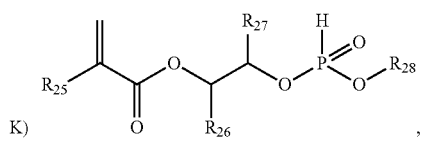

K)

where R25 is selected from H or CH3; R26, R27 are each independently selected from H, C1-C6 alkyl, C3-C8 cycloalkyl, or Phenyl; R28 is selected from H, C1-C22 alkyl, C3-C8 cycloalkyl, or Phenyl;

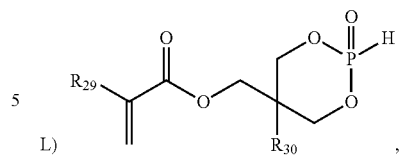

L)

where R29 is selected from H or CH3; R30 is selected from H, C1-C6 alkyl, C3-C8 cycloalkyl, or Phenyl;

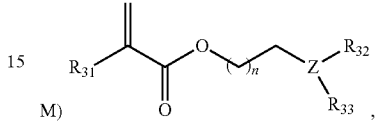

M)

where R31 is selected from H or CH3; R32 is selected from H, C1-C22 alkyl, C3-C8 cycloalkyl, or Phenyl; R33 is selected from H, C1-C22 alkyl, or C3-C8 cycloalkyl; Z is selected from N or P; and n is from 1 to 17;

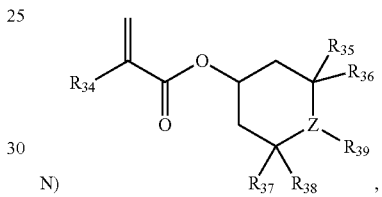

N)

where R34 is selected from H or CH3; R35, R36, R37, R38, R39 are each independently selected from H, C1-C22 alkyl, or C3-C8 cycloalkyl; Z is selected from N or P;

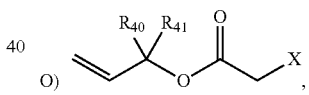

O)

where R40, R41 are each independently selected from H, C1-C6 alkyl, C3-C8 cycloalkyl, or Phenyl; and X is selected from CN, F, Cl, Br or I; and

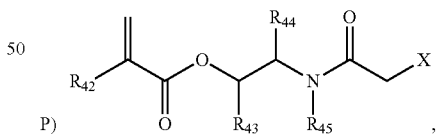

P)

where R42, R43, R44, R45 are each independently selected from H, C1-C6 alkyl, C3-C8 cycloalkyl, or Phenyl; and X is selected from CN, F, Cl, Br or I.

In one embodiment, the monomeric chain transfer agent is selected from the group consisting of structures A through 0, as shown above.

In one embodiment, the monomeric chain transfer agent is selected from the group consisting of structures A through J, as shown above.

In one embodiment, the monomeric chain transfer agent is selected from the group consisting of structures A through F, as shown above.

In one embodiment, the monomeric chain transfer agent is selected from the group consisting of structure D and structure J, as shown above.

In one embodiment, the monomeric chain transfer agent is selected from the group consisting of the following:

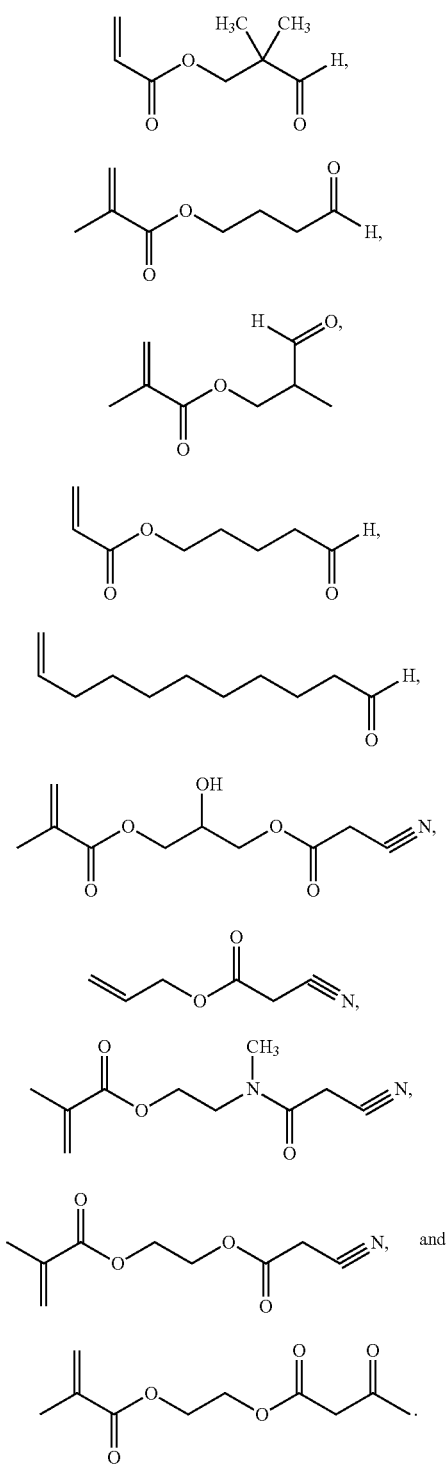

In one embodiment, the monomeric CTA is selected from the group consisting of i) through vii) and x), as shown above.

In one embodiment, the monomeric CTA is selected from the group consisting of i) through iv), vi), viii), ix) and x), as shown above.

In one embodiment, the monomeric CTA is selected from the group consisting of i) through iv), vi) and x), as shown above.

In one embodiment, the monomeric chain transfer agent is an acrylate or a methacrylate.

In one embodiment, the monomeric chain transfer agent is selected from the group consisting of the following: allyl thio glycolate, isobutyl aldehyde acrylate, allyl acetoacetate, and allyl cyanoacetate.

In one embodiment, the monomeric chain transfer agent is selected from the group consisting of the following: 2-propenoic acid, 2,2-dimethyl-3-oxopropyl ester; 2-(methacryloyloxy)ethyl acetoacetate; 2-methyl-3-oxopropyl methacrylate; 4-oxobutyl methacrylate; 2-(2-cyano-N-methylacetamido) ethyl methacrylate; 2-(2-cyanoacetoxy) ethyl methacrylate; 5-oxopentyl acrylate; and 3-(2-cyanoacetoxy)-2-hydroxypropyl methacrylate. In a further embodiment, the monomeric chain transfer agent is selected from 2-propenoic acid, 2,2-dimethyl-3-oxopropyl ester; 2-(methacryloyloxy)ethyl acetoacetate; 2-methyl-3-oxopropyl methacrylate; 4-oxobutyl methacrylate; 2-(2-cyano-N-methylacetamido) ethyl methacrylate; or 2-(2-cyanoacetoxy) ethyl methacrylate.

In one embodiment, the monomeric chain transfer agent is selected from the group consisting of the following: IBAA (isobutyl aldehyde acrylate or 2-propenoic acid, 2,2-dimethyl-3-oxopropyl ester); AAEM (2-(methacryloyloxy)ethyl acetoacetate); 4-oxobutyl methacrylate; 2-methyl-3-oxopropyl methacrylate, 5-oxopentyl acrylate; and 3-(2-cyanoacetoxy)-2-hydroxypropyl methacrylate. In a further embodiment, the monomeric chain transfer is selected from IBAA or AAEM.

In a preferred embodiment, the monomeric CTA is not a diene. Some examples of dienes include 1,5-hexadiene; 1,7-octadiene, 1,9-decadiene, ethylene glycol dimethacrylate, allyl methacrylate, diallyl phthalate, and 1,3-divinyl tetramethyl disiloxane.

In one embodiment, the monomeric CTA has $^1$H NMR signals from 3.0 to 5.0 ppm chemical shift.

In one embodiment, an inventive polymer is polymerized in the presence of at least two monomeric chain transfer agents as disclosed herein.

A monomeric CTA may comprise a combination of two or more embodiments as described herein.

Initiators

Free radical initiators are generally used to produce the inventive ethylene-based polymers. Exemplary organic peroxides include, but are not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxy initiators are used in an amount from 0.001 to 0.2 weight percent, based upon the weight of polymerizable monomers.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent of the combined weight of one or more additives, based on the weight of the inventive polymer.

In one embodiment the polymers of this invention are treated with one or more stabilizers, for example, antioxidants, such as IRGANOX 1010, IRGANOX 1076 and IRGAFOS 168 (Ciba Specialty Chemicals; Glattbrugg, Switzerland). In general, the polymers are treated with one or more stabilizers before extrusion or other melt processes.

Blends and mixtures of the inventive polymer with other polymers may be performed. Suitable polymers for blending with the inventive polymer include natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler-Natta LLDPE, "single-site catalyzed" PE, including multiple reactor PE ("in reactor" blends of Ziegler-Natta PE and "single-site catalyzed" PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes.

Applications

The polymers of this invention may be employed in a variety of conventional thermoplastic fabrication processes to produce useful articles, including monolayer and multilayer films; molded articles, such as blow molded, injection molded, or rotomolded articles; coatings; fibers; and woven or non-woven fabrics.

An inventive polymer may be used in a variety of films, including but not limited to, clarity shrink films, collation shrink films, cast stretch films, silage films, stretch hood, sealants, and diaper backsheets.

Other suitable applications include, but are not limited to, wires and cables, gaskets and profiles, adhesives; footwear components, and auto interior parts.

DEFINITIONS

The term "non-conjugated diunsaturated monomer," as used herein, refers to a molecule that has two non-conjugated carbon-carbon bonds anywhere in its structure, and preferably at the terminal ends of the molecule.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, may comprise at least one comonomer.

The term "ethylene-based interpolymer" refers to an interpolymer that comprises a majority amount of polymerized ethylene based on the weight of the interpolymer, and comprises at least one comonomer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density

Samples that were measured for density were prepared according to ASTM D 1928.

Samples were pressed at 374° F. (190° C.) and 30,000 psi for three minutes, and then at 70° F. (21° C.) and 30,000 psi for one minute. Density measurements were made within one hour of sample pressing, using ASTM D792, Method B.

Melt Index

Melt index, or I2, was measured in accordance by ASTM D 1238, Condition 190° C./2.16 kg, and was reported in grams eluted per 10 minutes. The I10 was measured in accordance with ASTM D 1238, Condition 190° C./10 kg, and was reported in grams eluted per 10 minutes.

Melt Strength

Melt strength was measured at 190° C. using a Göettfert Rheotens 71.97 (Göettfert Inc.; Rock Hill, S.C.). The melted sample (about 25 to 50 grams) was fed with a Göettfert Rheotester 2000 capillary rheometer, equipped with a flat entrance angle (180 degrees) of length of 30 mm and diameter of 2 mm. The sample was fed into the barrel (L=300 mm, Diameter=12 mm), compressed and allowed to melt for 10 minutes, before being extruded at a constant piston speed of 0.265 mm/s, which corresponds to a wall shear rate of $38.2\,s^{-1}$ at the given die diameter. The extrudate passed through the wheels of the Rheotens, located at 100 mm below the die exit, and was pulled by the wheels downward, at an acceleration rate of $2.4\,mm/s^2$. The force (in cN) exerted on the wheels was recorded as a function of the velocity of the wheels (in mm/s). Samples were repeated at least twice, until two curves of the force (in cN) as a function of strand velocity (in mm/s) superimpose, then the curve that had the highest velocity at the strand break was reported. Melt strength was reported as the plateau force (cN) before the strand broke.

Extensional Viscosity

Extensional viscosity was measured by an extensional viscosity fixture (EVF) of TA Instruments (New Castle, Del.), attached onto a model ARES rheometer of TA Instruments.

Extension viscosity at 150° C., and at Hencky strain rates of 10 s$^{-1}$, 1 s$^{-1}$ and 0.1 s$^{-1}$, was measured. A sample plaque was prepared on a programmable Tetrahedron model MTP8 bench top press. The program held 3.8 grams of the melt at 180° C., for five minutes, at a pressure of 1×10$^7$ Pa, to make a "75 mm×50 mm" plaque with a thickness from 0.7 mm to 1.1 mm. The TEFLON coated chase containing the plaque was then removed to the bench top to cool. Test specimens were then die-cut from the plaque using a punch press and a handheld die with the dimensions of "10×18 mm (Width× Length)." The specimen thickness was in the range of about 0.7 mm to about 1.1 mm.

The rheometer oven that encloses the EVF fixture was set to test temperature of 150° C., and the test fixtures that contact the sample plaque were equilibrated at this temperature for at least 60 minutes. The test fixtures were then "zeroed" by using the test software, to cause the fixtures to move into contact with each other. Then the test fixtures were moved apart to a set gap of 0.5 mm. The width and the thickness of each plaque were measured at three different locations on the plaque with a micrometer, and the average values of the thickness and width were entered into the test software (TA Orchestrator version 7.2). The measured density of the sample at room temperature was entered into the test software. For each sample, a value of "0.782 g/cc" was entered for the density at 150° C. These values are entered into the test software to allow calculation of the actual dimensions of the plaque at the test temperature. The sample plaque was attached, using a pin, onto each of the two drums of the fixture. The oven was then closed, and the temperature was allowed to equilibrate to 150° C.±0.5° C. As soon as the temperature entered this range, a stopwatch was manually started, and after 60 seconds, the automated test was started by clicking the software "Begin Test" button.

The test was divided into three automated steps. The first step was a "pre-stretch step" that stretched the plaque at a very low strain rate of 0.005 s$^{-1}$ for 11 seconds. The purpose of this step was to reduce plaque buckling, introduced when the plaque was loaded, and to compensate for the thermal expansion of the sample, when it was heated above room temperature. This step was followed by a "relaxation step" of 60 seconds, to minimize the stress introduced in the pre-stretch step. The third step was the "measurement step," where the plaque was stretched at the pre-set Hencky strain rate. The data collected in the third step was stored, and then exported to Microsoft Excel, where the raw data was processed into the Strain Hardening Factor (SHF) values reported herein.

Shear Viscosity

Sample Preparation for Shear Viscosity Measurement

Specimens for shear viscosity measurements were prepared on a programmable Tetrahedron model MTP8 bench top press. The program held 2.5 grams of the melt at 180° C., for five minutes, in a cylindrical mold, at a pressure of 1×10$^7$ Pa, to make a cylindrical part with a diameter of 30 mm and a thickness of 3.5 mm. The chase was then removed to the bench top to cool down to room temperature. Round test specimens were then die-cut from the plaque using a punch press and a handheld die with a diameter of 25 mm. The specimen was about 3.5 mm thick.

Shear Viscosity Measurement

Shear viscosity (Eta*) was obtained from a steady shear start-up measurement that was performed with the model ARES rheometer of TA Instruments, at 150° C., using "25 mm parallel plates" at a gap of 2.0 mm, and under a nitrogen purge. In the steady shear start-up measurement, a constant shear rate of 0.005 s$^{-1}$ was applied to the sample for 100 seconds. Shear viscosities were collected as a function of time in the logarithmic scale. A total of 200 data points were collected within the measurement period. The Strain Hardening Factor (SHF) is the ratio of the extensional viscosity to three times of the shear viscosity, at the same measurement time and at the same temperature.

Determination the Weight Fraction of Insoluble Materials

The weight fraction of the insoluble materials in each experimental polymer was determined as follows. Each polymer sample (0.1 g) was dissolved in 1,2,4-trichloro-benzene (TCB, 50 mL), at 155° C., for four hours, to make a "2.0 mg/mL solution." This solution was hot filtered through a Mott filter (Waters) or through a layer of Perlite. The filtrate was collected, and characterized on a High Temperature Gel Permeation Chromatograph (HT GPC, Waters Model 150C), equipped with an infrared concentration detector (IR-4, PolymerChar Inc.). The HT GPC had a fixed injection loop with a fixed injection volume (200 microliters). The concentration detector of the HT GPC was calibrated with NBS (National Bureau of Standards) 1475a, which is standardized polyethylene reference, at a concentration of 2.0 mg/mL. An instrument parameter, the mass constant, was determined as follows: $K_{MASS}=A_{ref}/C_{ref}$, where $A_{ref}$ is the area of the detector response of the NBS 1475a; $C_{ref}$ is the concentration of the NBS 1475a in TCB (units=mg/mL).

The detected concentration of the filtrate of the polymer sample was then obtained using the following equation: $C_{det}=A/K_{MASS}$, where A is the area of the detector response of filtrate of the polymer sample, and $K_{MASS}$ is the instrument constant (units=area·mL/mg).

The soluble mass recovery (SMR) in percentage of the polymer sample was calculated as follows: SMR=($C_{det}$/2.0*100. Here the number "2.0" represents the initial "2.0 mg/mL" concentration of the polymer sample.

The weight percentage (%) of insoluble materials in the polymer sample was determined from the following equation: Wt %=100−($C_{det}$/2.0*100.

Nuclear Magnetic Resonance ($^1$H NMR)

Each NMR sample was prepared by adding approximately "0.10 g of ethylene-based polymer" to "2.7 g of tetrachloroethane-d$_2$ (TCE), containing 0.001M Cr(AcAc)$_3$ (tris(acetylacetonato)-chromium(III))" in a "NORELL 1001-7.10 mm NMR tube." The samples were purged by bubbling nitrogen through the solvent via a pipette, inserted into the tube for approximately five minutes, to prevent oxidation, and then they were capped, sealed with TEFLON tape, and then soaked at room temperature overnight to facilitate sample dissolution. The samples were kept in a nitrogen purge box during storage, before, and after, preparation to minimize exposure to oxygen. The samples were heated and mixed with a vortex mixer at 115° C. to ensure homogeneity. Each sample was visually inspected to ensure homogeneity.

The data were collected using a BRUKER AVANCE 400 MHz NMR Spectrometer, equipped with a BRUKER DUAL DUL high-temperature CRYOPROBE, at a sample temperature of 120° C. Each analysis was run with a ZG pulse, 32 scans, SWH 10,000 Hz, AQ 1.64 s, and D1.14 s. Acquisitions were repeated using a D1 of 28 s to check quantitation, and results were equivalent.

EXPERIMENTAL

Inventive Ethylene-Based Polymers A-1, A-2 and A-3 and Control A-0

Monomeric CTA

Undiluted 2-propenoic acid, 2,2-dimethyl-3-oxopropyl ester (hereafter IBAA; CAS [69288-03-5]; see also U.S. Pat. No. 4,191,838) was loaded into a stainless steel supply vessel, and diluted with ethyl acetate, to produce a final concentration of 21.5 wt %. This vessel was purged with nitrogen.

Initiator

Peroxide initiator tert-butyl peroxyacetate (125 gm of a 20% by weight solution in ISOPAR™ H) was combined with 4400 gm of ISOPAR E, and loaded into a second stainless steel supply vessel. This vessel was purged with nitrogen.

Control (A-0)

Ethylene was injected at 5440 gm/hr (194 moles/hr), at a pressure of 1931 bar, into an agitated (1600 rpm) 300 mL high pressure CSTR reactor, with an external heating jacket set at 250° C. Propylene (CTA) was added to the ethylene stream at a pressure of 62 bar and at a rate of 100 gm/hr (2.38 mole/hr), before the mixture was compressed to 1931 bar, and injected into the reactor. The peroxide initiator was added directly to the reactor through the sidewall of the CSTR reactor, and at a pressure of 1931 bar, and at a rate of $1.85 \times 10^{-1}$ gm/hr (1.4 millimoles/hr). The ethylene conversion to polymer was 9.5 wt %, based on the mass of ethylene entering the reactor, and the average reaction temperature was 247° C. An ethylene-based polymer with a melt index (I2) of 1.13 g/10 min was formed. Approximately 490 grams of this ethylene-based polymer (A-0) was collected.

Inventive Ethylene-Based Polymers A-1, A-2 and A-3

Propylene (CTA) was added to the ethylene stream at a pressure of 62 bar, and at a rate of 69.9 gm/hr (1.66 mole/hr), before the mixture was compressed to 1931 bar, and injected into the reactor (see above). The solution of IBAA in ethyl acetate was pumped at a pressure of 1931 bar, and at a rate of 28.19 gm/hr (38.8 millimoles/hr) into the ethylene-propylene mixture, before said mixture was injected into the reactor. The peroxide initiator was added directly to the reactor, through the sidewall, at a pressure of 1931 bar, and at a rate of $2.26 \times 10^{-1}$ gm/hr (1.7 millimoles/hr). The ethylene conversion to polymer was 10.9 wt %, based on the mass of ethylene entering the reactor, and the average reaction temperature was 250° C. An ethylene-based polymer with a melt index (I2) of 1.10 g/10 min was formed. Approximately 870 grams of this ethylene-based polymer (A-1) was collected. The IBAA (mCTA) amount was increased twice to form two more inventive polymers (A-2 and A-3). Reaction polymerization conditions are summarized below in Table 1. Properties of the polymers are shown in Table 2 below.

Calculation of Incorporated Moles of IBAA Per 1000 Moles of Backbone Carbons

Each inventive ethylene-based polymer and control was analyzed by $^1$H NMR. Virgin homopolymer of ethylene made by the high pressure radical process has >99.9% of its $^1$H NMR signal area in the region of 3 to −1 ppm (chemical shift), and <0.1% of its $^1$H NMR signal area in the region of 3 to 12 ppm (chemical shift). The $^1$H NMR signal area in the region of 3 to −1 ppm (chemical shift) corresponds to the backbone hydrogen region of the $^1$H NMR spectrum of LDPE. Because every mole of backbone carbon has two moles of backbone hydrogens bonded to it, if the moles of backbone hydrogens are measured, one can calculate the moles of backbone carbons. Furthermore, when IBAA or AAEM is copolymerized with ethylene to make the respective inventive ethylene-based polymers, some chemical moieties of these comonomers have $^1$H NMR signals in the region of 3 to 12 ppm (chemical shift). It is common practice to express moles of various structural features of LDPE, for example moles of comonomer like IBAA or AAEM, in terms of moles of the structural feature per 1000 moles of backbone carbons (1000 C).

To measure these molar ratios, the $^1$H NMR of the inventive polymer is acquired, and the signal area from a chemical shift of approximately 3 to −1.0 ppm is integrated, and set to 2000 moles of protons using the $^1$H NMR software. This step normalizes the signal area of this region to "2000 moles of protons," which represents "1000 moles of backbone carbons," because on average every backbone carbon in LDPE is bonded to 2 protons. The $^1$H NMR software automatically ratios all other proton signals to this value of "2000 moles of backbone protons." If comonomers are present in the sample, they may have chemical moieties that have $^1$H NMR signals in the region of 3 to 12 ppm (chemical shift). In the case of IBAA, the hydrogens of the —O—CH$_2$— moiety have a signal with a chemical shift in the range of 4.01 to 4.25 ppm. In addition, the aldehyde hydrogen has a chemical shift in the range of 9.51 to 9.68. Total moles of incorporated IBAA per 1000 moles of backbone carbons (1000 C) are determined as ½ the normalized integration of the —O—CH$_2$— signal from approximately 4.01 to 4.25 ppm. This procedure is valid because there is only one mole of —O—CH$_2$— moiety in

TABLE 1

Polymerization Conditions

|   | Ethylene (gm/hr) | Propylene (gm/hr) | t-butyl peroxy-acetate (gm/hr) | 21.5 wt. % IBAA in Ethyl Acetate (gm/hr) | Reaction Temperature (° C.) | Ethylene Conversion (wt. %) | Ethylene-Based Polymer Collected (gm) |
|---|---|---|---|---|---|---|---|
| A-0 | 5440 | 100 | 0.185 | 0 | 247° C. | 9.5 | 490 |
| A-1 | 5440 | 69.9 | 0.226 | 28.19 | 250° C. | 10.9 | 870 |
| A-2 | 5440 | 92.6 | 0.226 | 42.33 | 248° C. | 11.0 | 700 |
| A-3 | 5440 | 93.5 | 0.226 | 56.42 | 251° C. | 10.8 | 900 |

TABLE 2

Polymer Properties

|   | Density (gm/cm3) | Melt Index (I2) (g/10 min) | Melt Strength (cN) | Strain Hardening Factor at 10 s$^{-1}$ | Strain Hardening Factor at 1 s$^{-1}$ | Insolubles (wt %) |
|---|---|---|---|---|---|---|
| A-0 | 0.920 | 1.13 | 16.6 | 9.20 | 11.53 | 3.6 |
| A-1 | 0.921 | 1.10 | 19.3 | 10.15 | 11.89 | 3.8 |
| A-2 | 0.922 | 1.65 | 18.2 | 15.51 | 18.63 | 4.3 |
| A-3 | 0.921 | 1.66 | 18.1 | 19.87 | 27.33 | 6.1 | every mole of IBAA. The total moles of the IBAA aldehyde protons remaining (not consumed by reacting by chain transfer) is determined directly from the integral of the aldehyde proton at approximately 9.51 to 9.68 ppm, since there is only one mole of aldehyde protons for every mole of IBAA. The calculated moles of IBAA branches per 1000 moles of backbone carbons (1000 C) is determined by subtracting the unreacted moles of aldehyde from the incorporated moles of IBAA per 1000 C. See sample calculation below. The NMR results are summarized in Table 3 below.

TABLE 3

NMR Results

| Polymer | Incorporated Moles of IBAA Per 1000 C | Unreacted Moles of Aldehyde Per 1000 C | Calculated Moles of IBAA Branches Per 1000 C |
|---|---|---|---|
| A-1 | 0.61 | 0.55 | 0.06 |
| A-2 | 0.88 | 0.78 | 0.095 |
| A-3* | 1.15 | 1.01 | 0.14 |

*Example Calculation for A-3: Integration from approximately 3 to −1.0 ppm: set to 2000 moles of hydrogens, which represents carbons (1000 C). One-half of the integration of —O—CH$_2$— at approximately 4.01 to 4.25 ppm = 2.30/2 = 1.15 moles —O—CH$_2$— moiety, and therefore 1.15 moles of IBAA per 1000 moles of backbone carbons (1000 C). Integration of aldehyde proton at approximately 9.51 to 9.68 ppm = 1.01 moles of unreacted aldehyde H per 1000 moles of backbone carbons (1000 C). Calculated moles of IBAA branches per 1000 moles of backbone carbons = 1.15 − 1.01 = 0.14 moles of IBAA branches per 1000 moles of backbone carbons (1000 C).

For the ethylene-based polymers A-1, A-2 and A-3, the monomeric CTA "2-propenoic acid, 2,2-dimethyl-3-oxopropyl ester (IBAA)" copolymerized into each polymer backbone. FIG. 1 depicts the $^1$H NMR profile for the control A-0 polymer (lower profile) and the $^1$H NMR profile for the inventive A-3 polymer (upper profile). Also, all of the inventive polymers with IBAA had higher melt strength values than the control polymer (A-0), which did not contain the IBAA. The melt strength of the control without IBAA (A-0) was 16.6 cN at a melt index (I2) of 1.13. The melt strength of polymer A-1 was 19.3 cN at a melt index (I2) of 1.10, the melt strength of polymer A-2 was 18.2 cN at a melt index (I2) of 1.65, and the melt strength of polymer A-3 was 18.1 cN at a melt index (I2) of 1.66. In addition, the extensional viscosity—Strain Hardening Factor was higher at both strain rates of 10 s$^{-1}$ and 1 s$^{-1}$ for each inventive polymer A-1, A-2 and A-3, as compared to the control sample (A-0) that did not contain IBAA. At the same time, the insoluble content of all four ethylene-based polymers was less than 10 wt %; thus, low insoluble content was maintained in the inventive polymers.

Inventive Ethylene-Based Polymers B-1, B-2 and B-3 and Control B-0

Monomeric CTA

Undiluted 2-(methacryloyloxy)ethyl acetoacetate (hereafter AAEM; CAS [21282-97-3]; Eastman Chemical Company) was loaded into a 0.25 L glass supply vessel, which was open to the atmosphere.

CTA

A fresh 250 mL bottle of undiluted propionaldehyde (97%) was used as a supply vessel, which was open to the atmosphere.

Initiator

The peroxide initiator tert-butyl peroxyacetate (2.3 grams of a 50% by weight solution in isododecane) was combined with 500 mL of n-heptane, and loaded into a third glass supply vessel. This solution was purged with nitrogen to minimize dissolved oxygen.

Control (B-0)

Ethylene was injected at 1000 gm/hr (35.65 moles/hr), at a pressure of 2000 bar, into an agitated (2000 rpm) 54 mL high pressure CSTR reactor, with an external heating jacket set at 187° C. Without added peroxide initiator, only 0.1 wt % of the ethylene entering the reactor polymerized. Next the propionaldehyde was degassed by an HPLC degasser, and then was added to the ethylene stream at a pressure of 250 bar, and at a rate of 3.23 gm/hr (56 millimoles/hr), before the mixture was compressed to 2000 bar. The peroxide initiator was added to the ethylene-propionaldehyde mixture at a pressure of 2000 bar, and at a rate of 2.2×10$^{-3}$ gm/hr (0.017 millimoles/hr), before the mixture entered the reactor. The ethylene conversion to polymer was 10.5 wt % based on the mass of ethylene entering the reactor, and the average reaction temperature was 219° C. An ethylene-based polymer having a melt index (I2) of 2.9 g/10 min was obtained. Approximately 50 grams of ethylene-based polymer was collected (Control B-0).

Inventive Ethylene-Based Polymers B-1, B-2 and B-3

Undiluted AAEM was pumped at a pressure of 250 bar, and at a rate of 1.65 gm/hr (7.7 millimoles/hr) through an HPLC degasser, and then into the propionaldehyde stream, and mixed before said mixture was added to the ethylene stream and compressed to 2000 bar. The peroxide initiator was added to the ethylene-propionaldehyde-AAEM mixture at a pressure of 2000 bar, and at a rate of 2.5×10$^{-3}$ gm/hr (0.019 millimoles/hr), before the mixture entered the reactor. The ethylene conversion to polymer was 10 wt % based on the mass of ethylene entering the reactor, and the average reaction temperature was 216° C. An ethylene-based polymer having a melt index (I2) of 3.2 g/10 min was obtained. Approximately 100 grams of ethylene based polymer was collected (B-1). The AAEM (mCTA) amount was increased twice to form two more inventive polymers (B-2 and B-3). Reaction polymerization conditions are summarized below in Table 4. Some polymer properties are shown in Table 5 below.

TABLE 4

Polymerization Conditions

|  | Ethylene (g/hr) | Propionaldehyde (g/hr) | t-butyl peroxyacetate (g/hr) | AAEM (g/hr) | Reaction Temperature (° C.) | Ethylene Conversion (wt %) | Ethylene-Based Polymer Collected (g) |
|---|---|---|---|---|---|---|---|
| B-0 | 1000 | 3.23 | 0.0022 | 0 | 219° C. | 10.5 | 50 |
| B-1 | 1000 | 3.23 | 0.0025 | 1.65 | 216° C. | 10 | 100 |
| B-2 | 1000 | 3.23 | 0.0025 | 2.44 | 217° C. | 10 | 65 |
| B-3 | 1000 | 3.23 | 0.0028 | 3.26 | 220° C. | 10.6 | 75 |

TABLE 5

Polymer Properties

| | Density (gm/cm3) | Melt Index (I2) | Melt Strength (cN) | Strain Hardening Factor at 10 s$^{-1}$ | Strain Hardening Factor at 1 s$^{-1}$ | Insolubles (wt %) |
|---|---|---|---|---|---|---|
| B-0 | 0.928 | 2.9 | 7.2 | 6.98 | 7.44 | 1.9 |
| B-1 | 0.929 | 3.2 | 8.4 | 8.10 | 8.88 | 1.4 |
| B-2 | 0.931 | 3.1 | 9.5 | 8.76 | 11.50 | 3.1 |
| B-3 | 0.931 | 2.8 | 11.4 | 11.74 | 15.40 | 5.4 |

Calculation of Incorporated Moles of AAEM Per 1000 Moles of Backbone Carbons

The same $^1$H NMR spectrum acquisition and normalization procedure was used for AAEM inventive polymers, as was used for IBAA inventive polymers above. For AAEM inventive polymers, the moles of incorporated AAEM per 1000 moles of backbone carbons (1000 C) is determined as ¼ the integral of the —O—CH$_2$—CH$_2$—O— moiety from approximately 3.78 to 4.56 ppm (chemical shift), because one mole of this moiety is present for every mole of AAEM. See sample calculation below. The NMR results are summarized in Table 6 below.

TABLE 6

$^1$H NMR Results

| Sample Number | Incorporated Moles of AAEM Per 1000 C |
|---|---|
| B-1 | 0.78 |
| B-2 | 1.19 |
| B-3* | 1.55 |

*Example Calculation for B-3: Integration from approximately 3 to −1.0 ppm: set to 2000 moles of hydrogens, which represents 1000 moles of backbone carbons (1000 C). One-fourth of integration of —O—CH$_2$—CH$_2$—O— at approximately 3.78 to 4.56 ppm = ¼ (6.18) = 1.55 moles of this moiety, and therefore 1.55 moles of AAEM per 1000 moles of backbone carbons (1000 C).

Figure 2:
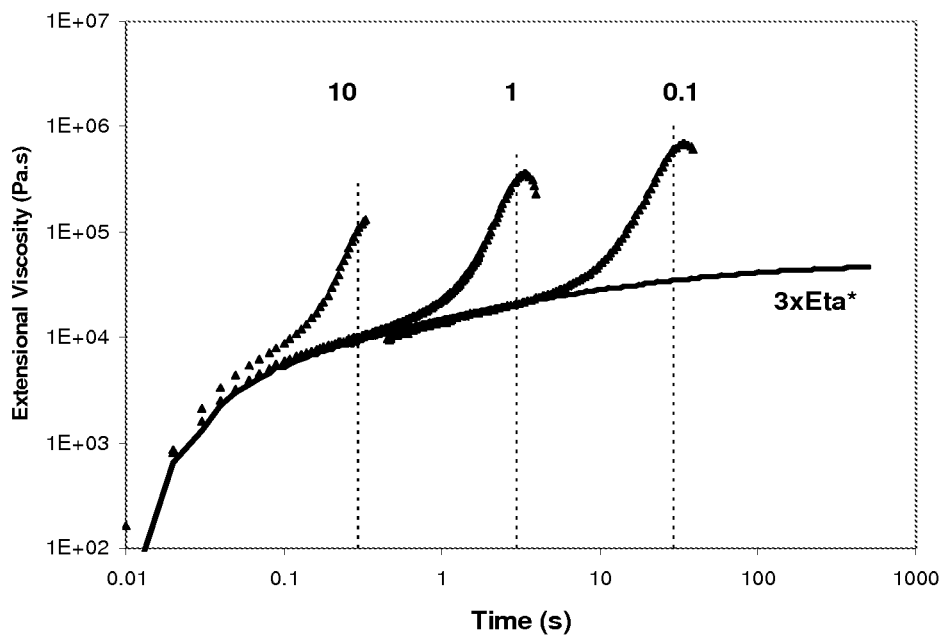
FIG. 2 is a plot of extensional viscosity versus time for inventive ethylene-based polymer B-3, at Hencky strain rates of 10 s$^{-1}$, 1.0 s$^{-1}$ and 0.1 s$^{-1}$, and at 150° C. In this figure, "Eta*" is the shear viscosity in Pa·s.

For the ethylene-based polymer B-1, B-2 and B-3, the monomeric CTA "2-(methacryloyloxy)ethyl acetoacetate (AAEM)" copolymerized into each polymer backbone. Also, all of the inventive polymers with the AAEM had higher melt strength values than the control polymer (B-0), which did not contain the AAEM. The melt strength of the control without AAEM (B-0) was 7.2 cN at a melt index (I2) of 2.9. The melt strength of polymer B-1 was 8.4 cN at a melt index (I2) of 3.2, the melt strength of polymer B-2 was 9.5 cN at a melt index (I2) of 3.1, and the melt strength of polymer B-3 was 11.4 cN at a melt index (I2) of 2.8. In addition, the extensional viscosity—Strain Hardening Factor was higher at both strain rates of 10 s$^{-1}$ and 1.0 s$^{-1}$ for each inventive polymer B-1, B-2 and B-3, as compared to the control sample (B-0) that did not contain AAEM. See also FIG. 2, which is a plot of extensional viscosity versus time for inventive ethylene-based polymer B-3, at Hencky strain rates of 10 s$^{-1}$, 1.0 s$^{-1}$ and 0.1 s$^{-1}$, and at 150° C.

Inventive Ethylene-Based Polymers C-1 and Control C-0

Monomeric CTA

A mixture of 2-methyl-3-oxopropyl methacrylate, CAS [1215085-21-4] see U.S. 2011/0144267, (45 gm); 4-oxobutyl methacrylate, CAS [139288-31-6], see U.S. 2011/0144267, (54 gm); and n-heptane (74 gm) was loaded into a 0.25 L glass supply vessel, which was open to the atmosphere.

CTA

A fresh 250 mL bottle of undiluted propionaldehyde (97%) was used as a supply vessel, which was open to the atmosphere.

Initiator

The peroxide initiator tert-butyl peroxyacetate (2.3 grams of a 50% by weight solution in isododecane) was combined with 500 mL of n-heptane, and loaded into a third glass supply vessel. This solution was purged with nitrogen to minimize dissolved oxygen.

Control (C-0)

Ethylene was injected at 1000 gm/hr (35.65 moles/hr), at a pressure of 2000 bar, into an agitated (2000 rpm) 54 mL high pressure CSTR reactor, with an external heating jacket set at 187° C. Next the propionaldehyde was degassed by an HPLC degasser, and then was added to the ethylene stream at a pressure of 250 bar, and at a rate of 3.6 gm/hr (62 millimoles/hr), before the mixture was compressed to 2000 bar. The peroxide initiator was added to the ethylene-propionaldehyde mixture at a pressure of 2000 bar, and at a rate of 2.5×10$^{-3}$ gm/hr (0.019 millimoles/hr), before the mixture entered the reactor. The ethylene conversion to polymer was 10.5 wt % based on the mass of ethylene entering the reactor, and the average reaction temperature was 205° C. An ethylene-based polymer having a melt index (I2) of 1.5 g/10 min was obtained. Approximately 90 grams of ethylene-based polymer was collected (Control C-0).

Inventive Ethylene-Based Polymers C-1

The monomeric CTA solution was pumped at a pressure of 250 bar, and at a rate of 2.73 gm/hr (10 millimoles/hr of monomeric CTA) through an HPLC degasser, and then into the propionaldehyde stream, and mixed before said mixture was added to the ethylene stream and compressed to 2000 bar. The peroxide initiator was added to the ethylene-propionaldehyde-mCTA mixture at a pressure of 2000 bar, and at a rate of 4.0×10$^{-3}$ gm/hr (0.030 millimoles/hr), before the mixture entered the reactor. The ethylene conversion to polymer was 9 wt % based on the mass of ethylene entering the reactor, and the average reaction temperature was 201° C. An ethylene-based polymer having a melt index (I2) of 1.8 g/10 min was obtained. Approximately 50 grams of ethylene based polymer was collected (C-1). Reaction polymerization conditions are summarized below in Table 7. Some polymer properties are shown in Table 8 below.

TABLE 7

| | Polymerization Conditions | | | | | | |
|---|---|---|---|---|---|---|---|
| | Ethylene (g/hr) | Propion- aldehyde (g/hr) | t-butyl peroxy acetate (g/hr) | Aldehyde- Methacrylate mCTA (g/hr) | Reaction Temperature (° C.) | Ethylene Conversion (wt. %) | Ethylene- Based Polymer Collected (g) |
| C-0 | 1000 | 3.6 | 0.0022 | 0 | 205° C. | 10.5 | 90 |
| C-1 | 1000 | 3.6 | 0.0040 | 1.56 | 201° C. | 9 | 50 |

TABLE 8

| | Polymer Properties | | |
|---|---|---|---|
| Polymer | Melt Index (I2) | Melt Strength (cN) | Insolubles (wt %) |
| C-0 | 1.5 | 9.1 | 3.8 |
| C-1 | 1.8 | 10.2 | 33.9 |

Inventive Ethylene-Based Polymers D-1 and Control D-0

Monomeric CTA

A mixture of 2-(2-cyano-N-methylacetamido) ethyl methacrylate (80 gm; CAS [116928-90-6]; see also EP 376590 A2), and 2-propanol (80 gm) was loaded into a 0.25 L glass supply vessel, which was open to the atmosphere.

CTA

A fresh 250 mL bottle of undiluted propionaldehyde (97%) was used as a supply vessel, which was open to the atmosphere.

Initiator

The peroxide initiator tert-butyl peroxyacetate (2.3 grams of a 50% by weight solution in isododecane) was combined with 500 mL of n-heptane, and loaded into a third glass supply vessel. This solution was purged with nitrogen to minimize dissolved oxygen.

Control (D-0)

Ethylene was injected at 1000 gm/hr (35.65 moles/hr), at a pressure of 2000 bar, into an agitated (2000 rpm) 54 mL high pressure CSTR reactor, with an external heating jacket set at 187° C. Next the propionaldehyde was degassed by an HPLC degasser, and then was added to the ethylene stream at a pressure of 250 bar, and at a rate of 3.7 gm/hr (64 millimoles/hr), before the mixture was compressed to 2000 bar. The peroxide initiator was added to the ethylene-propionaldehyde mixture at a pressure of 2000 bar, and at a rate of $2.3 \times 10^{-3}$ gm/hr (0.017 millimoles/hr), before the mixture entered the reactor. The ethylene conversion to polymer was 8 wt % based on the mass of ethylene entering the reactor, and the average reaction temperature was 204° C. An ethylene-based polymer having a melt index (I2) of 3.3 g/10 min was obtained. Approximately 60 grams of ethylene-based polymer was collected (Control D-0).

Inventive Ethylene-Based Polymers D-1

The monomeric CTA solution was pumped at a pressure of 250 bar, and at a rate of 3.2 gm/hr (7.6 millimoles/hr of monomeric CTA) through an HPLC degasser, and then into the propionaldehyde stream, and mixed before said mixture was added to the ethylene stream and compressed to 2000 bar. The peroxide initiator was added to the ethylene-propionaldehyde-mCTA mixture at a pressure of 2000 bar, and at a rate of $6.3 \times 10^{-3}$ gm/hr (0.048 millimoles/hr), before the mixture entered the reactor. The ethylene conversion to polymer was 11 wt % based on the mass of ethylene entering the reactor, and the average reaction temperature was 220° C. An ethylene-based polymer having a melt index (I2) of 5 g/10 min was obtained. Approximately 70 grams of ethylene based polymer was collected (D-1). Reaction polymerization conditions are summarized below in Table 9. Some polymer properties are shown in Table 10 below.

TABLE 9

| | Polymerization Conditions | | | | | | |
|---|---|---|---|---|---|---|---|
| | Ethylene (g/hr) | Propion- aldehyde (g/hr) | t-butyl peroxy- acetate (g/hr) | 2-cyano-N- methyl acetamido ethyl methacrylate mCTA (g/hr) | Reaction Temperature (° C.) | Ethylene Conversion (wt. %) | Ethylene-Based Polymer Collected (g) |
| D-0 | 1000 | 3.7 | 0.0023 | 0 | 204° C. | 8 | 60 |
| D-1 | 1000 | 3.6 | 0.0063 | 1.6 | 220° C. | 11 | 70 |

TABLE 10

| | Polymer Properties | |
|---|---|---|
| Polymer | Melt Index (I2) | Melt Strength (cN) |
| D-0 | 3.3 | 6.1 |
| D-1 | 5 | 7.9 |

Inventive Ethylene-Based Polymers E-1 and Control D-0

Monomeric CTA

A mixture of 2-(2-cyanoacetoxy)ethyl methacrylate (80 gm; CAS [21115-26-4]; see also U.S. Pat. No. 3,658,878A and U.S. Pat. No. 3,554,987A), and 2-propanol (80 gm) was loaded into a 0.25 L glass supply vessel, which was open to the atmosphere.

CTA

A fresh 250 mL bottle of undiluted propionaldehyde (97%) was used as a supply vessel, which was open to the atmosphere.

Initiator

The peroxide initiator tert-butyl peroxyacetate (2.3 grams of a 50% by weight solution in isododecane) was combined with 500 mL of n-heptane, and loaded into a third glass supply vessel. This solution was purged with nitrogen to minimize dissolved oxygen.

Control

Sample D-0 was used as a control for inventive ethylene-based polymers E-1 and E-2 since the melt index of D-0 was similar to those of E-1 and E-2.

Inventive Ethylene-Based Polymers E-1

The monomeric CTA solution was pumped at a pressure of 250 bar, and at a rate of 2.8 gm/hr (7.2 millimoles/hr of monomeric CTA) through an HPLC degasser, and then into the propionaldehyde stream, and mixed before said mixture was added to the ethylene stream and compressed to 2000 bar. The peroxide initiator was added to the ethylene-propionaldehyde-mCTA mixture at a pressure of 2000 bar, and at a rate of $4.7 \times 10^{-3}$ gm/hr (0.036 millimoles/hr), before the mixture entered the reactor. The ethylene conversion to polymer was 11.7 wt % based on the mass of ethylene entering the reactor, and the average reaction temperature was 210° C. An ethylene-based polymer having a melt index (I2) of 3.5 g/10 min was obtained. Approximately 95 grams of ethylene based polymer was collected (E-1). Reaction polymerization conditions are summarized below in Table 11. Some polymer properties are shown in Table 12 below.

Inventive Ethylene-Based Polymers E-2

The monomeric CTA solution was pumped at a pressure of 250 bar, and at a rate of 4.2 gm/hr (10.7 millimoles/hr of monomeric CTA) through an HPLC degasser, and then into the propionaldehyde stream, and mixed before said mixture was added to the ethylene stream and compressed to 2000 bar. The peroxide initiator was added to the ethylene-propionaldehyde-mCTA mixture at a pressure of 2000 bar, and at a rate of $4.2 \times 10^{-3}$ gm/hr (0.032 millimoles/hr), before the mixture entered the reactor. The ethylene conversion to polymer was 11.8 wt % based on the mass of ethylene entering the reactor, and the average reaction temperature was 216° C. An ethylene-based polymer having a melt index (2) of 3.5 g/10 min was obtained. Approximately 80 grams of ethylene based polymer was collected (E-2). Reaction polymerization conditions are summarized below in Table 11. Some polymer properties are shown in Table 12 below.

TABLE 11

Polymerization Conditions

| | Ethylene (g/hr) | Propionaldehyde (g/hr) | t-butyl peroxyacetate (g/hr) | 2-cyano-N-methyl acetamido ethyl methacrylate mCTA (g/hr) | Reaction Temperature (° C.) | Ethylene Conversion (wt. %) | Ethylene-Based Polymer Collected (g) |
|---|---|---|---|---|---|---|---|
| D-0 | 1000 | 3.7 | 0.0023 | 0 | 204° C. | 8 | 60 |
| E-1 | 1000 | 3.6 | 0.0047 | 1.4 | 210° C. | 11.5 | 95 |
| E-2 | 1000 | 3.6 | 0.0042 | 2.1 | 216° C. | 11.8 | 80 |

TABLE 12

Polymer Properties

| Polymer | Melt Index (I2) | Melt Strength (cN) |
|---|---|---|
| D-0 | 3.3 | 6.1 |
| E-1 | 3.5 | 10.9 |
| E-2 | 3.5 | 12.2 |

The invention claimed is:

1. An ethylene-based polymer formed from ethylene and at least one monomeric chain transfer agent (monomeric CTA) comprising a copolymerization end and a chain transfer end; wherein the polymer comprises a majority amount of polymerized ethylene, based on the weight of the polymer; and wherein the chain transfer end of the monomeric chain transfer agent is selected from the group consisting of the following 1) through 4):

1) 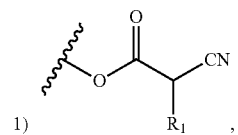, where R1 is selected from H, C1-C22 alkyl, C3-C8 cycloalkyl, CN, Phenyl, COCH3, Cl, Br, or I;

2) 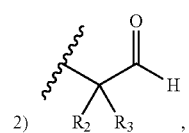, where R2, R3 are each independently selected from H, C1-C22 alkyl, C3-C8 cycloalkyl, CN, Phenyl, or COCH3;

3) 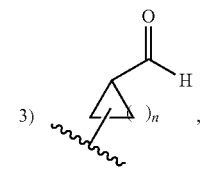, where n is from 1 to 6;

4) 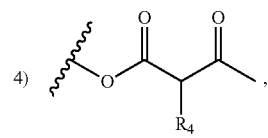, where R4 is selected from H, C1-C22 alkyl, C3-C8 cycloalkyl, Phenyl, Cl, Br, or I;

and wherein the ethylene-based polymer comprises ethylene and said at least one monomeric CTA as the only monomeric units.

2. The ethylene-based polymer of claim 1, and wherein the at least one monomeric chain transfer agent is not a non-conjugated diunsaturated monomer.

3. The ethylene-based polymer of claim 1, wherein the copolymerization end of the at least one monomeric chain transfer agent is selected from the group consisting of the following:

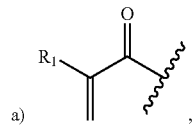
a)

where R1 is selected from H, CH3, CH2CH3, CN, or COCH3;

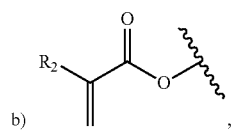
b)

where R2 is selected from H, CH3, CH2CH3, CN, or COCH3;

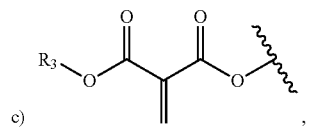
c)

where R3 is selected from H, C1-C22 alkyl, C3-C8 cycloalkyl, or Phenyl;

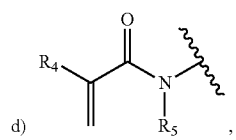
d)

where R4 is selected from H, CH3, CH2CH3, CN, or COCH3, and R5 is selected from H, C1-C22 alkyl, C3-C8 cycloalkyl, Phenyl, or COCH3;

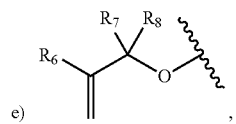
e)

where R6, R7, R8 are each independently selected from H, CH3, or CH2CH3;

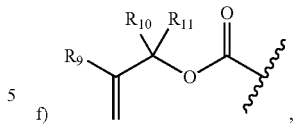
f)

where R9, R10, R11 are each independently selected from H, CH3, or CH2CH3;

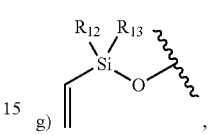
g)

where R12, R13 are each independently selected from H, CH3, CH2CH3 or Phenyl;

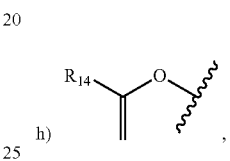
h)

where R14 is selected from H, CH3, CH2CH3, or CN; and

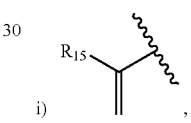
i)

where R15 is selected from H, C1-C22 alkyl, C3-C8 cycloalkyl, or Phenyl.

4. The ethylene-based polymer of claim 1, wherein the at least one monomeric CTA has 1H NMR signals from 3.0 to 5.0 ppm chemical shift.

5. The ethylene-based polymer of claim 1, wherein the ethylene-based polymer has a melt strength [MS] (cN) and melt index I2 (g/10 min) according to the following equation:

$$[MS] > 15.5 * EXP\left[-\frac{\log(I_2)}{1.07}\right] - 2.4.$$

6. The ethylene-based polymer of claim 1, wherein the polymer has a strain hardening factor (SHF) greater than 3, at Hencky strain rates from $10 \text{ s}^{-1}$ to $1.0 \text{ s}^{-1}$.

7. A composition comprising the ethylene-based polymer of claim 1.

8. An article comprising at least one component formed from the composition of claim 7.

9. The article of claim 8, wherein the article is a film or a coating.

10. The composition of claim 7, further comprising an ethylene/α-olefin interpolymer with a density less than, or equal to, 0.94 g/cc.

11. An article comprising at least one component formed from the composition of claim 10.

* * * * *